UNITED STATES PATENT OFFICE.

EDUARD MAY, OF VIENNA, AUSTRIA-HUNGARY.

PRESERVATIVE COMPOUND.

SPECIFICATION forming part of Letters Patent No. 626,435, dated June 6, 1899.

Application filed January 19, 1897. Serial No. 619,802. (No specimens.)

*To all whom it may concern:*

Be it known that I, EDUARD MAY, a citizen of Austria, and a resident of Vienna, in the Empire of Austria-Hungary, have invented certain new and useful improvements in methods of and means for the preservation of meat of all kinds, poultry, game, fish, &c., during long time and without cooling, of which the following is a specification.

This invention relates to an improvement in a composition for the preservation of animal food—as, for example, meat, poultry, game, fish, butter, eggs, &c.—for a long time by coating the surface of the food to be treated with a fine but notwithstanding homogeneous and adhesive layer or film of antiseptic ingredients dissolved in a liquid which evaporates after the composition has been applied to the food, so that the remaining layer or film prevents acting of the atmospheric air upon the food. By this treatment with the preserving composition neither the nutritive value nor the color or the taste and smell of the food will be diminished.

The new composition required for carrying out the method of preservation above explained is prepared as follows: Eight ounces of benzoate of soda and two to three ounces of bisulphite of lime are dissolved in distilled water in a proportion of one ounce of the material to one-half of a pint of water. The solutions are allowed to pass a filter. To the filtered liquid thus obtained I add a quantity—say twelve ounces—of boroglyceride, or, instead of boroglyceride, say, two ounces of fluoride of ammonia dissolved in half a pint of water. The resulting thick mass is introduced into a bottle of about twenty pints' capacity, and wood-spirit and pure alcohol are added in equal quantities until the bottle is entirely filled. The whole mass is allowed to stand for some days in the bottle. Care is to be taken to shake the bottle every day several times until an entirely limpid liquid is obtained. In case this composition is desired to be used for smoked meat it is preferred to dissolve the composition only in pure wood-spirit. To the limpid liquid thus obtained I add five pints of pure glycerine and about two ounces of tartaric acid in the state of a fine powder. Wood-spirit, as well as pure alcohol, is used as a solvent for the purpose of obtaining the highest degree of division of the active materials and to assist by evaporation adhesion of the formed layer or film to the surface of the treated food. The glycerine has for its object to prevent any penetration of the composition into the treated food, and after the evaporation of the alcohol it forms connecting means for the protecting-layer. The composition thus obtained is limpid and tastes of glycerine and of alcohol. This composition is now extremely fit for the preservation of food as before named. I use the same in the following manner: The food to be preserved and not having been previously washed or moistened is brushed or sprinkled with the composition and then hung up to allow the surplus of the composition to run down. The treatment above described is sufficient to preserve the food in good condition for about ten or twelve days; but when it is required to preserve the food longer—say from four to six weeks—I employ a supplemental protection, as described below.

In the first case—viz., for a shorter time of preservation—the food treated with my new composition is brought into a space filled with relatively pure air—as, for example, into a magazine or store-room—and therein it is hung up for twelve to twenty-four hours in order to allow the alcohol to evaporate. Care must be taken to exclude draft in order to prevent the food from drying. The air in the room should not be moist nor exposed to considerable fluctuations of temperature. Evaporation of the alcohol being completed, the food is wrapped in linen or similar cloth and stored in a suspended or lying position. In this state draft does no damage to the preserved food. The latter may remain in the wrapper for twelve to fourteen days without turning putrid or losing taste, color, and nutritive value. Even summer temperature does not influence preservation. The food treated with the composition is washed in cold water with a brush or by hand before it is used.

In case a food treated in the manner as before described and after having been stored for, say, twelve to fourteen days shows a white coating on its surface it will be necessary to remove such coating by simply wiping it off and to treat the food again with the composition as the first time. The food may then be stored for further twelve to fourteen days.

In the second case where it is desired to preserve food for some weeks the same is treated with the composition, as before explained, and brought into a hermetically-closed vessel provided with cocks at the top and at the bottom for the admission and for the emission of carbonic acid and with a manometer in order to allow a person to know the pressure of the carbonic acid contained in the vessel. This vessel is charged with meat, game, fish, &c., treated with the new composition. Then the upper cock is opened while the lower one is connected with a reducing-valve placed on a bottle filled with liquid carbonic acid. The reducing-valve allows entering of the carbonic acid into the vessel under considerably-diminished pressure and the now gaseous carbonic acid removes the air from the vessel through the upper open cock. This cock is then closed and carbonic acid is allowed to enter the vessel until the manometer indicates pressure of about half an atmosphere in the vessel, whereupon the upper cock is closed. When the food has remained for a fortnight in the vessel, it is advisable to allow the carbonic acid to escape and to introduce a fresh supply into the vessel. Before the food is used it should be aired during twenty-four hours and washed. In case, however, the food is not to be used at once it may be hung in fresh air for a fortnight.

Having now described and particularly ascertained the nature of my invention and the manner in which to practically carry it through, I declare that what I consider to be new, and therefore claim as my invention, is—

1. The preserving composition containing benzoate of soda, bisulphite of lime, water, boroglyceride, a suitable solvent, and tartaric acid.

2. The preserving composition containing benzoate of soda, bisulphite of lime, water, boroglyceride, wood-spirit, alcohol, and tartaric acid.

Signed at Vienna, in the Empire of Austria-Hungary, this 5th day of January, 1897.

EDUARD MAY.

Witnesses:
 HARRY BELMONT,
 JOHN LUST.